United States Patent [19]

Snow

[11] 4,340,084
[45] Jul. 20, 1982

[54] CHECK VALVE

[75] Inventor: John P. Snow, Sagamore Hills, Ohio

[73] Assignee: Houdaille Industries, Inc., Ft. Lauderdale, Fla.

[21] Appl. No.: 182,235

[22] Filed: Aug. 28, 1980

[51] Int. Cl.³ .............................................. F16K 15/04
[52] U.S. Cl. .................................... 137/512; 137/512.3; 137/516.27; 137/539; 137/516.29; 251/358
[58] Field of Search ...................... 137/516.25, 516.27, 137/516.29, 539, 539.5, 533.11, 512, 512.3; 251/358

[56] References Cited

U.S. PATENT DOCUMENTS

| | | | |
|---|---|---|---|
| 1,725,297 | 8/1929 | Paterson | 137/516.29 |
| 2,262,169 | 11/1941 | Crowley | 137/539 X |
| 2,306,012 | 12/1942 | Campbell | 137/539 X |
| 3,134,572 | 5/1964 | Glasgow | 137/516.29 X |
| 3,324,673 | 6/1967 | Lindahl et al. | 137/539 X |
| 3,386,470 | 6/1968 | Goda et al. | 137/512 |
| 3,447,564 | 6/1969 | North et al. | 137/512 |
| 4,086,936 | 5/1978 | Vork | 137/516.29 X |

FOREIGN PATENT DOCUMENTS 2328864 5/1977 France .
194494 3/1967 U.S.S.R. ............................. 137/539.5

Primary Examiner—William R. Cline
Attorney, Agent, or Firm—Hill, Van Santen, Steadman, Chiara & Simpson

[57] ABSTRACT

A ball check valve having a body with a through passageway having an internally restrictive frustoconical seat is provided with a frustoconical metallic backup member having a different cone angle than the seat and a large diameter ball having a maximum diameter greater than the maximum diameter of the backup member, the backup member having a contoured large diameter axial end face for receipt of a portion of the ball such that a seal is provided between the seat and the ball and between the backup member and the seat and means urging the ball against the backup member large diameter axial end and the backup member against the seat.

10 Claims, 3 Drawing Figures

CHECK VALVE

BACKGROUND OF THE INVENTION

1. Field of the Invention

This invention relates to valves and, more particularly, to ball relief valves.

2. Prior Art

Ball valves having a valve body with an internal valve seat closable by a spring urged ball are well-known to the art and have been extensively used for many years. Such devices usually have a passageway through the body with a reduced diameter valve seat formed interiorly of the body either by a ledge formed in the passageway or by the insertion of a separate valve seat member. The ball is placed downstream of the valve seat and is spring urged toward the valve seat. In such constructions, sealing occurs between the periphery of the valve seat and the outer surface of the ball. When pressure builds on the upstream side of the seat to an extent where the total pressure against the exposed surface of the ball interior of the seat inner periphery exceeds the pressure of the spring against the ball, the ball will unseat and pressure will be relieved past the ball.

Such known devices have a singular disadvantage in that in order to provide a good seal both the valve seat and the ball surface must be highly polished by machining or coining or the valve can leak. Even when properly manufactured such valves are not considered to be air tight.

In order to reduce this, it has been known to use frustoconical valve seats and non-ball valves. Such non-ball valves have included devices having frustoconical exterior surfaces having tapers substantially the same as the taper of the frustoconical valve seat, tapered stoppers having tapers different than the taper of the valve seat and, in some instances, stoppers having additional sealing members such as O-rings. Such an O-ring seal is shown, for example, in U.S. Pat. No. 2,481.482, which also illustrates a tapered stopper and valve seat. Such devices however, have a further disadvantage in that they have two seal surfaces, i.e. at the juncture of the O-ring seal with the valve seat and at the wall of the O-ring groove.

Although these devices have worked as both pop relief valves, for the most part, they still rely upon the use of metallic sealing members.

Elastomeric sealing members, such as O-rings and synthetic or natural rubber balls, have a known disadvantage in that they will cold flow under the influence of pressure. Over prolonged periods of time this can result in the elastomeric sealing member either being extruded through the valve seat opening or being distorted into the valve seat to a point where it will no longer seal properly and will not open at the desired pressure differential. It would therefore be an advance in the art to provide a pressure release valve or pop valve which utilizes an elastomeric seal member to reduce the expense necessary in production of polished mating seal faces but which, however, is provided with means preventing distortion or cold flow of the elastomeric member from occuring, and preventing extrusion of the elastic member through the valve seat.

SUMMARY OF THE INVENTION

These objectives are accomplished in this invention which utilizes a valve body having a passage therethrough having, intermediate its axial ends, a frustoconical valve seat. A back-up member having a frustoconical exterior surface is receivable in the valve seat. The back-up member has a large diameter axial end which is contoured to provide a recess. An elastomeric seal member, which may be a ball, having a dimension sufficiently large to seal against the side walls of the valve seat is spring urged against the recess. The dimension of the recess with respect to the ball is such that the full diameter of the ball cannot be received in the recess. The valve seat is dimensioned such that the full diameter of the ball is greater than the full diameter of the valve seat at a point where the backing member is completely seated in the valve seat and the ball is completely seated in the recess. Spring means are provided for urging the ball into sealing relationship.

In a further embodiment of the invention, the elastomeric ball seal is used in connection with a standard metallic ball seal whereby two axially spaced seals are provided within a single valve body. A spring acting between the back-up member and the metallic ball seats the metallic ball against its respective seat while a secondary spring acting between the elastomeric ball and an adjustable stop urges the elastomeric ball and the back-up member to sealed positions.

It is therefore an object of this invention to provide an improved valve design utilizing an elastomeric sealing element.

It is another, and more specific object of this invention to provide an improved valve utilizing an elastomeric ball seatable against a frustoconical valve seat backed by a metallic backing member which is also seatable against the frustoconical valve seat.

Other objections, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
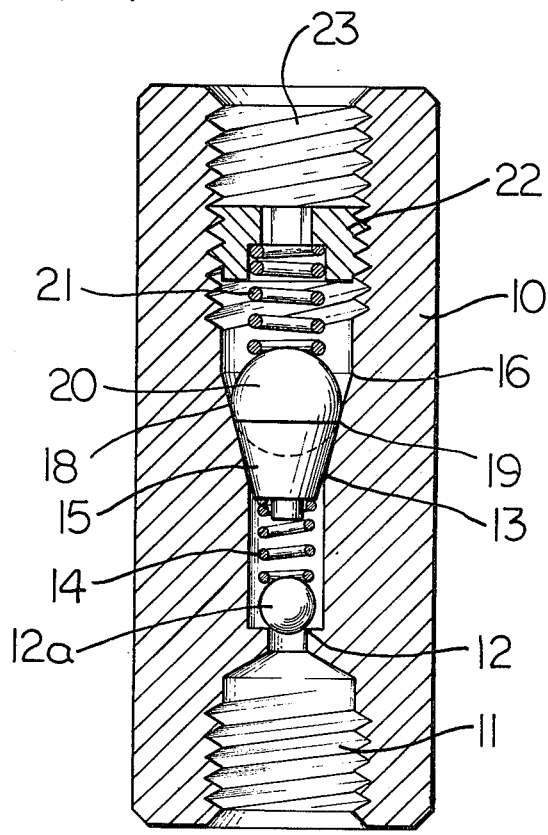
FIG. 1 is a cross-sectional view of a valve according to this invention.

As best shown in FIG. 1, the seal of this invention includes a valve body 10 having a passageway 11 therethrough. In the embodiment illustrated in FIG. 1, the passageway 11 has two axially spaced valve seats 12 and 13. As shown, the valve seat 12 may be a standard ledge seat, or as is known to the art, may be formed with a slight chamfer surface at the seat, and may, if desired, be formed as a separate insert. A metallic ball 12a is urged against the seat 12 by spring 14.

The valve seat 13 is a frustoconical seat and may be formed of the material of the valve body as illustrated, or may, if desired, be formed as an insert. A backing member 15 is provided having a frustoconical exterior surface. The backing member is dimensioned to be seated within the valve seat 13 intermediate its axial ends. The valve seat 13 and backing member 15 are dimensioned such that the large diameter axial end 16 of the valve seat is beyond the point of greatest penetration of the back-up member 15 so that with the back-up member 15 fully seated in the valve seat 13 a portion 18 of the valve seat extends downstream of the large diameter axial end 19 of the back-up member 15.

An elastomeric ball 20 is urged by spring 21 against the back-up member 15. The elastomeric ball has a diameter greater than the diameter of the large diameter end 19 of the back-up member and is dimensioned with respect to the seat 13 to sealingly contact the portion 18 beyond the large diameter axial end of the back-up member 15 when the back-up member is seated in the valve seat 13. Spring 21 is adjustable by means of adjusting plug 22 threaded into the threaded opening 23 of the bore 11.

In the embodiment illustrated in FIG. 1, two valves are provided in a common valve body, the valves being respectively the ball 12a and seat 12 and the ball 20 and the seat 13. Back-up member 15, although seated in seat 13, may, if desired, be made with an unpolished surface and therefore, although forming a seal of sorts, does not have to be a high performance seal member because the ball 20, being elastomeric, would be urged into seal with the portion of the land 18 irrespective of minor surface irregularities in the land. In this manner, the device illustrated is less expensive to manufacture than heretofore used ball or conical stopper valves since the seat 13 and back-up member of stopper 15 do not have to be high machined.

Figure 3:
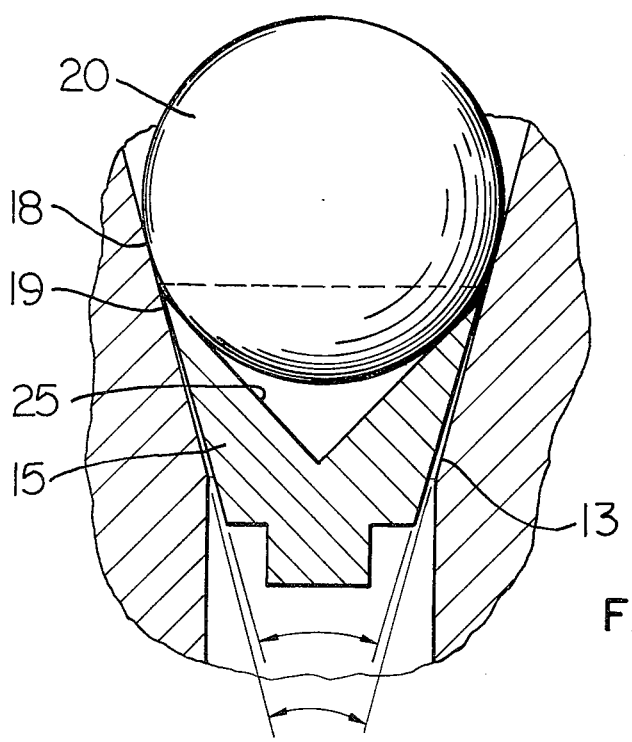
FIG. 3 is a fragmentary enlarged cross-sectional view of the main seal and back-up of this invention.

As best illustrated in FIG. 3, the large diameter axial end 19 of back-up member 15 is provided with an axial depression 25. The depression 25 may, as illustrated, be formed by a simple conical drill or it may be fully contoured to the normal radius of ball 20. Preferably, the tapers of the seat 13 and back-up member 15 are different with the back-up member having a larger taper. In the embodiment shown, the back-up member 15 has a 32° conical taper. The exact taper is not critical and tapers between 20° and 120° may be used. The difference in taper between the seat and back-up member may be from 0.25° to 10°. The larger the difference and the larger the diameter of the depression 25, the more the axial end 19 will act as a lip seal against the valve seat. The use of tapers over 20° and the use of different tapers on the back-up member and seat assure that the seal at the back-up seal interface is self-releasing and not self-holding and that the seal contact will be at the axial end of the back-up member to prevent extrusion of the ball between the seat and back-up member. A 46° taper seat and 47°–48° taper back-up member is also useful.

Preferably, as illustrated in FIG. 3, the dimensions of the ball with respect to the seat are such that sealing occurs along a cordal line not at the diameter of the ball. This allows a good seal to be made if the ball becomes slightly compressed or obrounded due to the pressure of the spring 21.

Although I have herein shown a ball 20 as the primary seal member, other shapes may be used, such as, for example, a half ball seated in the depression 25 but of a larger full diameter than the back-up axial end, parabolic outer surface members, or, even, conically shaped surfaces. Further, the ball 20 or other shaped primary seal member may, depending upon various factors such as pressure and the composition of the fluid or gas to be sealed, be formed of different resilient material such as, Teflon, a registered trademark of the I. E. DuPont Demours Company, Viton, Urethane, Nylon, etc. The preferred shapes and materials will be chosen such that the ball 20 or other primary seal member shape creates, in use, a single circumferential seal surface and is not flowable into any crack of opening between the back-up member 15 and the seal seat 13 at the axial end 19.

In one embodiment of this invention, a valve capable of being used in relatively high pressure applications without leak was constructed with an elastomeric ball 20 formed of Viton artificial rubber having a Shore "A" durometer hardness of between 70 and 90, and preferably, approximately 80. A spring having a spring rate of approximately 26 pounds per inch was used for the spring 21. A spring having a spring rate of approximately 7 pounds per inch was used as the spring 14. A 30° conical taper seat was provided for seat 13 having a small diameter opening on the downstream side of approximately 0.25". This compared with an approximately 0.125 opening for seat 12. A 0.188 diameter metal ball was provided for valve ball 12a, whereas the elastomeric ball 20 had a diameter of approximately 0.375".

Figure 2:
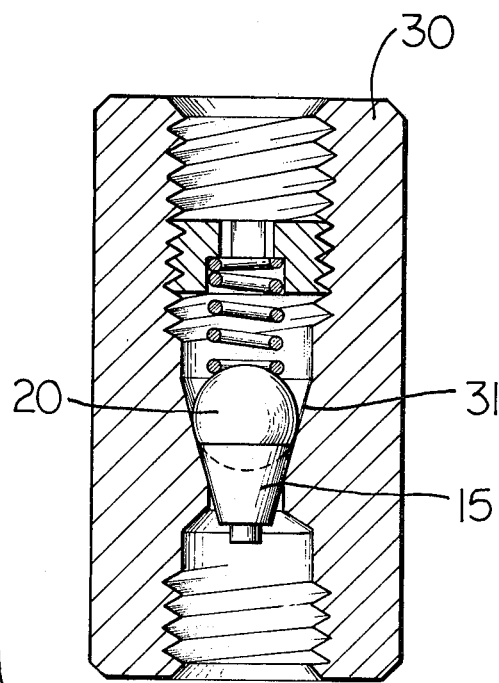
FIG. 2 is a view similar to FIG. 1 illustrating a modification of the valve of this invention.

FIG. 2 illustrates a valve 30 substantially identical to the valve of FIG. 1 except that a single valve seat is provided at conical end 31. The valve seat includes elastomeric ball 20 and back-up member 15 substantially the same as FIG. 1. The principal difference between the valve of FIG. 1 and FIG. 2 is the elimination of the second ball valve 12, 12a.

It can therefore be seen that this invention provides an improved elastomeric ball valve. Due to the provisions of a conical seat and a conical surface metallic back-up member 15, an elastomeric ball 20 can be used as the principal seal member without danger of extrusion of the ball 20 through the seat 13. The back-up member having a contoured surface for receipt of the ball 20 assists in both preventing extrusion of the ball and preventing great deformation of the ball while allowing the ball 20 to deform slightly to compensate for any irregularities in the surface of the sealing seat portion 18.

It should be understood that the valve body may be an independent body or may formed as a part of another device. The materials chosen for the body, seat, back-up member, etc. may vary depending upon the desired use of the valve and the economics of manufacturing.

Although the teachings of my invention have herein been discussed with reference to specific theories and embodiments, it is to be understood that these are by way of illustration only and that others may wish to utilize my invention in different designs or applications.

I claim as my invention:

1. In a ball valve having a valve body with a passageway therethrough, the passageway including a circumferential restricting valve seat, and a ball spring urged against said seat to provide a seal, the improvement of said valve seat being a frustoconical seat, a frustoconical metallic back-up member having a large diameter axial end of greater diameter than the small diameter of the seat, and a small diameter axial end of smaller diameter than the large diameter of the seat and a large diameter axial end face, the large diameter axial end face having a central depression therein, and the ball being an elastomeric ball, the back-up member insertable into the seat and seatable therein and being axially movable with respect thereto, the spring urging the ball against the depression and the back-up member against the seat.

2. A valve comprising: a valve body having a bore therethrough, a conical valve seat in said bore intermediate the ends thereof, a back-up member having a conical outer periphery receivable in the seat and having a large diameter end greater than the small diameter end of the seat, a seal ball having a diameter greater than a diameter of the seat downstream of the position of the large diameter end of the back-up member when the back-up member is fully seated against the seat, the back-up member being solid and axially movable with respect to the seat, a spring urging the ball against the back-up member, the ball having a peripheral portion circumferentially contacting the seat.

3. The device of claim 2 wherein the back-up member has a greater cone angle than the seat.

4. The device of claim 3 wherein the ball seals against the seat along a non-diametrical cordal line through the ball.

5. The device of claim 4 wherein the ball is constructed of an artificial elastomer having a Shore "A" durometer hardness greater than 70.

6. A valve comprising a valve boring having a conical seat with an axial dimension therein, a conical back-up member having a large diameter axial end with a diameter greater than the minor diameter of the conical seat receivable in the conical seat with the large diameter axial end engaging the conical seat intermediate axial ends of the conical seat, the back-up member constructed of a substantially rigid material, an elastomeric seal member engaging a depression in the axial end, the seal member having a large diameter part spherical surfaced portion having a diameter greater than the diameter of the axial end located downstream of the back-up member when the back-up member is seated in the seat and the seal member is in contact with the depression, the larger diameter portion being within the axial length of the conical seat and sealingly engaging the conical seat circumferentially thereof at a seal surface, the seal member having a solid cross-section taken at the line of the seal surface with the seat whereby only one circumferential seal line is present for the seal member.

7. The valve of claim 6 wherein the depression is closely spaced to the outer periphery of the axial end whereby the outer periphery at the axial end is circumferentially expandible acting as a lip seal.

8. A valve comprising a valve body having a bore therethrough having at least first and second diameters, a conical transition land between the first and second diameters having a taper of between 20° and 120°, a substantially rigid solid back-up member received in said transition area, the back-up member having a conical surface with a taper angle greater than the taper angle of the transition land, the back-up member terminating in an axial end surface having a large diameter end of greater diameter than the small diameter of the transition land whereby the back-up member is seated in the transition land adjacent the axial end, an elastomeric member having a full diameter greater than the diameter of the axial end, the seal member constructed of elastomeric material and being in contact with the back-up member, the seal member providing a circumferential seal contact with the transition land axially of the axial end, spring means acting against the seal member urging the seal member against the back-up member and the back-up member against the transition surface.

9. The device of claim 8 wherein the seal member is an elastomeric ball.

10. The valve of claim 8 wherein the differing tapers between the back-up member and the transition surface provide self-release tapers.

* * * * *